United States Patent Office 3,498,802
Patented Mar. 3, 1970

3,498,802
STEAM TREATMENT PROCESS TO PRODUCE THERMOPLASTIC MATERIALS AND HYDRAULIC CEMENTS
Hugh L. Bickford, Buffalo, and Loris G. Sawchuk and Stanley D. Stookey, Corning, N.Y., assignors to Corning Glass Works, Corning, N.Y., a corporation of New York
No Drawing. Filed Apr. 13, 1967, Ser. No. 630,537
Int. Cl. C04b 7/00; C04c 3/30
U.S. Cl. 106—39                 8 Claims

ABSTRACT OF THE DISCLOSURE

This invention relates to the manufacture of thermoplastic materials and hydraulic cements from certain glass compositions. More particularly, this invention relates to the manufacture of such products through the steam treatment of glass powders in the alkali metal silicate composition field.

A thermoplastic material is one having the property of softening when heated and of hardening and becoming rigid again when cooled. Hence, such a material is normally hard at room temperature but will soften and become moldable, adhesive, and cohesive when heated to some higher temperature. This property of thermoplasticity is well-recognized in such organic materials as cellulose acetate, polyethylene, and vinyl polymers and in glasses at temperatures around and somewhat above the softening points thereof. The valve of this property is apparent in the forming of articles through molding, pressing, extrusion, rolling, etc., and in forming composite structures, laminates, and the like.

A hydraulic cement is one that is capable of hardening under the influence of water. Hence, such a material, when mixed with water and allowed to stand, gradually sets up as a hard, massive solid structure. Portland cement is probably the best known material commercially of this type.

We have now discovered that glass powders falling within a critical range of alkali metal silicate compositions, when treated in a particular manner in a steam atmosphere, can be converted to materials exhibiting thermoplastic behavior which, both alternatively and additionally, when dampened with water, set like hydraulic cements. Thus, we have found that glass powders within the $Na_2O-SiO_2$ and $K_2O-SiO_2$ composition systems can be converted to such products by treatment in a steam atmosphere. Since the resultant products are hydraulic cements as well as thermoplastic materials, their wide versatility and usefulness are readily apparent.

Alkali metal silicate glasses in granulated or powdered form containing less than 80 mol percent $SiO_2$ dissolve in hot water, thereby becoming the soluble silicates or "water glass" of commerce. In patent application, Ser. No. 630,508, filed concurrently with the instant specification by S. D. Stookey, one of the applicants herein, is described the production of massive glass and glass-ceramic articles of alkali metal silicate compositions which, when treated in a steam atmosphere, will exhibit rubbery properties. That application discloses that such glasses can be made from compositions consisting essentially, on the oxide basis in mol percent, of about 60–94% $SiO_2$ and 6–40% $Na_2O$ and/or $K_2O$ and such glass-ceramic articles can be made from compositions consisting essentially, on the oxide basis in mol percent, of about 70–95% $SiO_2$ and 5–30% $Na_2O$ and/or $K_2O$.

Our invention is founded upon the discovery that although finely-divided particles of alkali metal silicate glasses, i.e., particles passing through sieve No. 100 of the Standard Screen Scale (0.149 mm.), consisting essentially of about 80–94 mol percent $SiO_2$ and 6–20 mol percent $R_2O$, wherein $R_2O$ consists of $Na_2O$, $K_2O$, and mixtures thereof, will not react appreciably with water and whatever reaction does occur comprises merely a surface leaching of alkali ions from the glass, leaving a still higher silica glass surface, such glass particles can be treated with steam at or above about 100° C. and transformed thereby into non-porous particles exhibiting thermoplasticity and which also have the capability of forming hydraulic cements. Since the reaction of the glass particles with steam begins at the surface of the grains and proceeds inward, either a surface layer only or the whole grain can be made thermoplastic depending upon the size and composition of the grain and the duration of the steam treatment. The steam-treated glass particles contain up to about 30% by weight of water, the water molecules, we believe, being in true solution in the glass. Although the non-porous, steam-treated glass grains gain up to about 30% by weight, there is a decrease in density in the material resulting from a concomitant swelling and if, during steam treatment, the particles are in contact with one another, they swell and seal together to form a solid rubbery article which becomes harder on cooling or on air-drying and shrinks to a slightly smaller size.

These thermoplastics have the advantages over organic thermoplastics in being fireproof, odorless, lower in cost, non-toxic, and of being adherent to almost all kinds of surfaces. The forming temperatures therefor range from about 70°–120° C. and the steam-treated grains adhere very strongly to all kinds of surfaces, except certain plastics such as the fluorocarbons of which Teflon® is, perhaps, the best known, at temperatures within the same range, retaining this bond after cooling and/or drying.

As was noted above, glass compositions suitable for carrying out the invention consist essentially, on the oxide basis in mol percent, of about 80–94% $SiO_2$ and 6–20% $R_2O$, wherein $R_2O$ consists of $Na_2O$, $K_2O$, and mixtures thereof. Preferably, the total of $SiO_2$ and $R_2O$ constitutes at least about 90 mol percent of the composition. Various compatible metal oxides such as PbO, BaO, MgO, $B_2O_3$, $Al_2O_3$, and ZnO are frequently included in the glass in amounts not exceeding about 10 mol percent total to modify the melting and forming characteristics of the glass. CaO and $Li_2O$, if present, are generally held to less than 5 mol percent to avoid spontaneous crystallization and lack of steam reactivity.

In practicing the invention, a batch of the proper composition is melted and then cooled to a glass. This glass is subjected to some pulverizing or grinding means for granulating it to a particle size less than 100 mesh. The glass powder is then placed into a heating chamber into which steam can be introduced in a volume sufficient to create and maintain an atmosphere containing at least 50% and, preferably, 100% by weight steam and heated to a temperature of at least about 100° C. For practical reasons, air constitutes that part of the atmosphere other than steam but various inert gases, e.g., helium, argon, nitrogen, carbon dioxide, etc. can be utilized. The speed at which the reaction will occur between the steam and the glass particles increases as the temperature is raised. However, at temperatures above about 200° C., the rate of reaction is not significantly improved so temperatures between about 100°–200° C. are generally utilized although higher temperatures are operable. An autoclave furnishes a very practical heating chamber since steam under pressure provides for a more rapid conversion of the glass powder to the thermoplastic state, although at one atmosphere pressure has proven to be satisfactorily operable. The ability to use steam at atmospheric pressure is very advantageous from a commercial point of view since apparatus for inducing and controlling pressure is not required. Hence, the glass powder can be steam treated on a continuous basis utilizing Teflon® belts with temperatures about 100° C. at atmospheric pressure. The rate of reaction with steam decreases as the $SiO_2$ concentration in the original glass increases. If the granules are not maintained apart from one another, a solid sheet or block of the hydrated product forms which can be cooled and re-ground to powder. Alternatively, the granules can be kept isolated from each other as in a fluid bed or a column of steam and then cooled in air. Such a procedure can be more economical since the repulverizing step is avoided. Dry steam is preferred, particularly where high reaction temperatures are employed, because of the possibility of dissolving the particles, but wet steam is also suitable.

The following table records examples of glass compositions, expressed in mol percent on the oxide basis, suitable for this invention. Batches of the proper compositions were compounded from materials, either oxides or other compounds which, when melted together, are converted to the desired oxide composition in the proper proportions. The batch ingredients were carefully mixed together, ballmilled to aid in achieving a homogeneous melt, and then melted in open platinum or silica crucibles for about 5 hours at a temperature of about 1500° C. In commercial practice, of course, larger melts can be made in pots or continuous tanks following conventional glassmaking procedures. The crucible melts were then cooled as a glass by being drawn into cane, rolled into ribbon, cast into steel molds, or, in some instances, the melt was poured into water. In all cases, the glass was ground to a particle size at least passing through a 100 mesh screen and, usually, passing through a 200 mesh screen (0.074 mm.). Pouring the melt into water causes the glass to be broken up into finely-divided pieces and, therefore, shortens the grinding time necessary to achieve particle sizes less than 100 mesh. Nevertheless, in some instances, the water may cause an undesirable leaching of the glass surface so this practice may not be the most preferred, particularly in the lower silica compositions.

TABLE I

| | Percent | | | | | | | | | |
|---|---|---|---|---|---|---|---|---|---|---|
| | 1 | 2 | 3 | 4 | 5 | 6 | 7 | 8 | 9 | 10 |
| $SiO_2$ | 88 | 83 | 92 | 94 | 84 | 82.4 | 90 | 83.3 | 84.7 | 86.0 |
| $Na_2O$ | 12 | 17 | 8 | 6 | | | | | 12.8 | 14.0 |
| $K_2O$ | | | | | 13 | 17.6 | 10 | 15.7 | | |
| BaO | | | | | 3 | | | | | |
| PbO | | | | | | | | 1.0 | | |
| $Al_2O_3$ | | | | | | | | | 3.5 | |

The glass from each example was then ground to all pass a 100 mesh screen with over half of the particles passing through a 200 mesh screen and placed in an open flat Teflon®-lined aluminum pan which was introduced into an electrically-heated autoclave. The autoclave was heated to 100°–180° C. and an environment containing at least 50% by weight of steam created therein, the time taken to reach a steady state operating condition being about 30 minutes.

The powders were treated for times varying from about ¼–15 hours. The autoclave was then turned off, a 20-minute cooling period permitted, and the steel pans removed therefrom. It has been found that the use of steam under pressure expedites the reaction of the steam with the glass powder. Therefore, this constitutes the preferred practice of the invention.

For powders of glasses consisting of $Na_2O$ and $SiO_2$ only, a reaction time, utilizing steam under pressure and an atmosphere of essentially 100% water vapor, of ¼ hour was frequently sufficient to completely convert the glass to a product exhibiting thermoplasticity, particularly those glasses in the higher $Na_2O$ extreme of the composition range. For glasses composed of $K_2O$ and $SiO_2$ only, a reaction time of at least ½ hour was generally required for complete conversion. The addition of compatible oxides to the glass compositions generally requires an extension of steam treatment time for complete conversion. Longer steam treatments can be employed with no apparent deleterious effect on the final product but with no apparent improvement in thermoplasticity either. Hence, in the commercial practice of the invention, the minimum time sufficient to obtain complete conversion of a glass powder of a certain composition to a product exhibiting thermoplasticity is determined empirically and that steam treatment adhered to for so long as powders of the same compositions are being reacted.

Table II records various steam treatments which were applied to the examples of Table I. Where the steam pressure is recorded as zero, this signifies that steam was employed at atmospheric pressure. Steam content is reported in weight percent, the remainder of the environment consisting of air. After the treating times recorded, the glass powder was essentially completely hydrated. A temperature of at least about 100° C. is required for reaction in fractional length of times. At temperatures above about 200° C., foaming of the glass powder is hazarded unless the steam pressure is maintained at a high level. No particular advantage in product quality has been observed in utilizing temperatures above about 200° C. so the expensive pressure equipment required has come to render the use of such temperatures practical, but uneconomical.

TABLE II

| Example No. | Treating temperature (° C.) | Steam pressure (p.s.i.) | Water vapor content, percent | Treating Time (hrs.) |
|---|---|---|---|---|
| 1 | 100 | 0 | 100 | 1 |
| 1 | 120 | 18 | 100 | ¼ |
| 1 | 120 | 18 | 50 | 1 |
| 1 | 180 | 150 | 100 | 15 |
| 2 | 100 | 0 | 100 | 1 |
| 2 | 150 | 0 | 50 | 1 |
| 3 | 120 | 18 | 100 | ½ |
| 3 | 100 | 18 | 50 | 1 |
| 4 | 100 | 0 | 100 | 1 |
| 4 | 120 | 18 | 50 | 2½ |
| 5 | 100 | 0 | 100 | 2 |
| 5 | 120 | 18 | 100 | ½ |
| 6 | 100 | 18 | 75 | 1 |
| 6 | 150 | 0 | 75 | 1 |
| 7 | 100 | 0 | 100 | 2 |
| 7 | 120 | 18 | 100 | ¾ |
| 7 | 120 | 0 | 50 | 2½ |
| 7 | 180 | 150 | 100 | 15 |
| 8 | 100 | 18 | 50 | 2 |
| 8 | 100 | 18 | 100 | 1½ |
| 8 | 120 | 0 | 100 | 1½ |
| 9 | 120 | 18 | 100 | 2 |
| 10 | 180 | 150 | 100 | 15 |

Since the powder granules of each example were not kept separated from one another, a solid sheet of hydrated product formed which was cooled and re-ground to powder. The thermoplastic powders soften and become adhesive and cohesive on heating to 80°–120° C. They can be treated like the organic polymers, i.e., they can be pressed, hot-rolled as sheeting, extruded, or injection molded at 80°–120° C., to any desired shape. Example 1 is our preferred composition in view of its thermoplastic properties and chemical durability.

On the other hand, the anhydrous (non-hydrated) glass powder can be employed directly as the raw material for manufacturing products. Thus, for example, articles can be made by dry-pressing or slip casting the powdered glass and then treating the shape in a stream environment. Or, laminated sheet can be rolled in a hot steam atmosphere.

Alternatively, the anhydrous powdered glass can be partly crystallized by heating at about 900°–1000° C. to produce a different raw material, i.e., one in which each grain is stiffened by some crystalline silica (cristobalite, quartz, or tridymite) but also contains some steam-reactive alkali metal silicate glass. This crystalline powder likewise can be formed and steam-sintered to semicrystalline articles having a different range of physical properties from those made from the glass powder.

Both the anhydrous glass and the anhydrous semi-crystalline powders can be steam-reacted partly or completely, yielding a third and a fourth class of raw material powders (perhaps "intermediates" would be a more appropriate description) that contain molecular water and/or silanol groups (Si-OH) therein. These powders are thermoplastic and, when dampened with water, set like hydraulic cements. The hydrous powders do not require a steam atmosphere for fabrication. Steam-hydrated powders of Example 1, our prefered composition, have been mixed with water, together with various inert fillers such as sand, gravel, pebble, fly ash, etc., in the same manner as Portland cement is mixed with water and aggregate to form concrete, poured into molds, and allowed to set for 24 hours. Strong, resilient, solid, composite articles were formed which could readily be cut, drilled, and machined at that stage. When the molds were removed and the concrete allowed to stand in air, the composite articles continued to strengthen and harden. The setting rate can be increased with temperatures up to 100° C. above which bubbling may occur due to boiling water.

Shaped articles of steam-hydrated powders mixed with inert fillers in amounts from 10–50% by weight, have also been hot pressed. Thus, utilizing a hydraulic press with an auxiliary heating unit, articles were pressed at 4000–12,000 p.s.i. at 90°–120° C. for times ranging from about 1½–5 minutes. It was possible to drive a nail through articles made from Example 1 with 10 weight percent clay.

In order to test the possibility of reinforcing such cements, blocks of the cement have been cast containing glass and ceramic fibers, iron, aluminum, and copper bars, and wood powder.

Foams can be developed at low temperatures (80°–150° C.) utilizing the steam-reacted glass powder, the thermoplastic solid, or the hydraulic solid in the raw material. All three types of materials can be foamed by heating them until the water boils and produces bubbles within the soft plastic material. This can be done in the field (foam in place) with heaters or infrared lamps. Also, a continuous production line for low cost foamed sheet can be set up which could be simultaneously laminated to paper, aluminum foil or sheet, glass, and glass-ceramic bodies.

We claim:

1. Non-porous particles less than about 100 mesh in size having at least a surface portion thereof which exhibits thermoplasticity comprising particles of an alkali silicate glass wherein at least a surface portion thereof contains within its volume up to about 30% by weight of water, said alkali silicate glass particles consisting essentially, in mol percent on the oxide basis, exclusive of water contained within their volume, of about 80–94% $SiO_2$ and 6–20% $R_2O$, wherein $R_2O$ consists of $Na_2O$, $K_2O$, and mixtures thereof, the total of $SiO_2$ and $R_2O$ constituting at least about 90% of the composition.

2. Non-porous particles according to claim 1 containing crystals of at least one silica polymorph selected from the group consisting of cristobalite, quartz, and tridymite.

3. A composite article consisting of the non-porous particles according to claim 1 and an inert filler.

4. A composite article consisting of the non-porous particles according to claim 2 and an inert filler.

5. A method for making non-porous particles less than about 100 mesh in size having at least a surface portion thereof that exhibits thermoplasticity which comprises exposing particles less than about 100 mesh in size of an alkali silicate glass consisting essentially, in mol percent on the oxide basis, of about 80–94% $SiO_2$ and 6–20% $R_2O$, wherein $R_2O$ consists of $Na_2O$, $K_2O$, and mixtures thereof, the total of $SiO_2$ and $R_2O$ constituting at least about 90% of the composition, to a gaseous environment of at least 50% by weight steam at a pressure of at least one atmosphere and a temperature between about 100–200° C. for a period of time sufficient to develop at least a surface portion on said particles which contains within its volume up to about 30% by weight of water.

6. A method for making non-porous particles less than about 100 mesh in size containing crystals of at least one silica polymorph selected from the group consisting of cristobalite, quartz, and tridymite and having at least a surface portion thereof that exhibits thermoplasticity which comprises exposing particles less than about 100 mesh in size of an alkali silicate glass consisting essentially, in mol percent on the oxide basis, of about 80–94% $SiO_2$ and 6–20% $R_2O$, wherein $R_2O$ consists of $Na_2O$, $K_2O$, and mixtures thereof, the total of $SiO_2$ and $R_2O$ constituting at least about 90% of the composition, to a temperature between about 900°–1000° C. to cause the growth of said silica crystals therein and thereafter exposing said particles to a gaseous environment of at least 50% by weight steam at a pressure of at least about one atmosphere and a temperature between about 100–200° C. for a period of time sufficient to develop at least a surface portion on said particles which contains within its volume up to about 30% by weight of water.

7. A method for making a shaped article which comprises mixing the non-porous particles made in accordance with claim 5 with water, forming said mixture into the desired shape, and then drying.

8. A method for making a shaped article which comprises mixing the non-porous particles made in accordance with claim 6 with water, forming said mixture into the desired shape, and then drying.

References Cited

UNITED STATES PATENTS

| | | | |
|---|---|---|---|
| 3,181,959 | 5/1965 | Raine et al. | 106—64 |
| 3,275,470 | 9/1966 | Charles | 65—30 XR |
| 3,365,315 | 1/1968 | Beck et al. | 65—22 XR |

S. LEON BASHORE, Primary Examiner

J. H. HARMAN, Assistant Examiner

U.S. Cl. X.R.

65—30, 32, 33; 106—52, 74, 85